United States Patent
Jachalsky et al.

(10) Patent No.: US 9,646,386 B2
(45) Date of Patent: May 9, 2017

(54) METHOD AND APPARATUS FOR GENERATING TEMPORALLY CONSISTENT SUPERPIXELS

(71) Applicant: THOMSON LICENSING, Issy les Moulineaux (FR)

(72) Inventors: Joern Jachalsky, Wennigsen (DE); Khushboo Mittal, Aligarh (IN)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/912,285

(22) PCT Filed: Aug. 1, 2014

(86) PCT No.: PCT/EP2014/066631
§ 371 (c)(1),
(2) Date: Feb. 16, 2016

(87) PCT Pub. No.: WO2015/022208
PCT Pub. Date: Feb. 19, 2015

(65) Prior Publication Data
US 2016/0210755 A1 Jul. 21, 2016

(30) Foreign Application Priority Data
Aug. 16, 2013 (EP) .................... 13306156

(51) Int. Cl.
*G06K 9/00* (2006.01)
*G06K 9/34* (2006.01)
(Continued)

(52) U.S. Cl.
CPC .......... *G06T 7/0081* (2013.01); *G06K 9/6201* (2013.01); *G06T 5/40* (2013.01);
(Continued)

(58) Field of Classification Search
CPC ....... G06T 7/0081; G06T 5/40; G06T 9/6201; G06T 7/0097; G06T 2207/10016; G06T 2207/10024; G06K 9/4652; G06K 9/4671
See application file for complete search history.

(56) References Cited

U.S. PATENT DOCUMENTS

| 8,428,363 B2 * | 4/2013 | Tuzel .................... G06T 7/0081 382/173 |
| 8,712,154 B2 * | 4/2014 | Perbet .................. G06T 7/0081 382/173 |

(Continued)

FOREIGN PATENT DOCUMENTS

| EP | 2680226 | 1/2014 |
| EP | 2733666 | 5/2014 |

(Continued)

OTHER PUBLICATIONS

Zhao et al., "Spatiotemporal segmentation for stereoscopic video", 2014 International Conference on Multimedia and Expo Workshops (ICMEW), Chengdu, Korea, Jul. 14, 2014, pp. 1-5.

(Continued)

*Primary Examiner* — Samir Ahmed
(74) *Attorney, Agent, or Firm* — Tutunjian & Bitetto, P.C.

(57) ABSTRACT

A method and an apparatus for generating superpixels for a sequence of frames. A feature space of the sequence of frames is separated into a color subspace and a spatial subspace. A clustering is then performed in the spatial subspace on a frame basis. In the color subspace a clustering is performed on stacked frames. An erroneous temporal consistency of a superpixel associated to a frame is detected by performing a similarity check between a corresponding superpixel in one or more past frames and one or more future frames using two or more metrics. The affected superpixels is future frames are corrected accordingly.

21 Claims, 3 Drawing Sheets

(51) Int. Cl.
*G06T 7/00* (2017.01)
*G06K 9/62* (2006.01)
*G06T 5/40* (2006.01)

(52) U.S. Cl.
CPC .. *G06T 7/0097* (2013.01); *G06T 2207/10016* (2013.01); *G06T 2207/10024* (2013.01)

(56) References Cited

U.S. PATENT DOCUMENTS

| | | | | |
|---|---|---|---|---|
| 2003/0234772 | A1* | 12/2003 | Zhang | G06F 17/30843 345/177 |
| 2012/0327172 | A1* | 12/2012 | El-Saban | G06K 9/00228 348/14.02 |
| 2013/0071016 | A1* | 3/2013 | Omer | G06T 5/008 382/164 |
| 2013/0243307 | A1* | 9/2013 | Winter | G06T 7/0079 382/154 |
| 2013/0342559 | A1* | 12/2013 | Reso | G09G 5/02 345/591 |
| 2014/0063275 | A1* | 3/2014 | Krahenbuhl | G06T 7/0081 348/208.4 |
| 2014/0071347 | A1* | 3/2014 | Chen | H04N 1/60 348/576 |

FOREIGN PATENT DOCUMENTS

| | | |
|---|---|---|
| EP | 2765556 | 8/2014 |
| WO | WO2009047366 | 4/2009 |

OTHER PUBLICATIONS

Collomosse et al., "Stroke Surfaces: Temporally Coherent Artistic Animations from Video", IEEE Transactions on Visualization and Computer Graphics, vol. 11, No. 4, Jul./Aug. 2005, pp. 540-549.
Madden et al., "Detecting Major Segmentation Errors for a Tracked Person Using Colour Feature Analysis", 14th International Conference on Image Analysis and Processing, Modena, Italy, Sep. 10, 2007, pp. 524-529.
Erdem et al., "Temporal stabilization of Video Object Segmentation for 3D-TV applications", 2004 International Conference on Image Processing, Oct. 24, 2004, vol. 1, pp. 357-360.
Jachalsky et al: "04.2.1 Scene Analysis with Spatio-temporal consistency", European Union's Seventh Framework Programme FP7-ICT-2011-7 FP7-287639, Apr. 30, 2013, pp. 1-60.
Achanta et al., "SLIC Superpixels Compared to State-of-the-Art Superpixel Methods", IEEE Transactions on Pattern Analysis and Machine Intelligence, vol. 34, No. 11, Dec. 2011, pp. 2274-2282.
Achanta et al., "SLIC Superpixels," EPFL Technical Report 149300, Jun. 2010, pp. 1-15.
Chang et al., "A video representation using temporal superpixels", 2013 IEEE Conference on Computer Vision and Pattern Recognition (CVPR), Portland, Oregon, USA, Jun. 23, 2013; pp. 2051-2058.
Dai et al., "Semantic labeling of urban areas in remote sensing imagery using multiple exemplars-based matching", 2009 Joint Urban Remote Sensing Event; Shanghai, China, May 20, 2009, pp. 1-6.
Galasso et al., "Video segmentation with superpixels", Asian Conference on Computer Vision (ACCV), Daejeon, Korea, Nov. 1, 2012, pp. 1-14.
Horn et al., "Determining optical flow", Artificial intelligence, vol. 17, No. 1, Aug. 1981, pp. 185-203.
Levinshtein et al., "Spatiotemporal Closure", Computer Vision —ACCV 2010, vol. 6492, Kimmel et al. Editors, Springer, Berlin, Nov. 8, 2011, pp. 369-382.
Levinshtein et al., "TurboPixels: Fast Superpixels Using Geometric Flows", IEEE Transactions on Pattern Analysis and Machine Intelligence, vol. 31, No. 12, Dec. 2009, pp. 2290-2297.
Li et al., "Application of seeded region growing to color image segmentation", Journal of Chinese Computer Systems, vol. 29, No. 6, Jun. 6, 2008, pp. 1163-1167. English Abstract.
Moore et al., "Superpixel lattices", 2008 IEEE Conference on Computer Vision and Pattern Recognition (CVPR), Anchorage, Alaska, USA, Jun. 23, 2008, pp. 1-8.
Piek et al., "Unsupervised motion-based object segmentation refined by color", Proceedings of the SPIE—The International Society for Optical Engineering, vol. 5150, No. 1, Jun. 16, 2003, pp. 346-357.
Ren et al., "Learning a classification model for segmentation", 2003 IEEE International Conference on Computer Vision (ICCV), Nice, France, Oct. 13, 2003, pp. 10-17.
Van Den Bergh et al., "Real-time stereo and flow-based video segmentation with superpixels", 2012 IEEE Workshop on Applications of Computer Vision (WACV), Breckenridge, Colorado, USA, Jan. 9, 2012, pp. 89-96.
Van Den Bergh et al., "SEEDS: Superpixels extracted via energy-driven sampling", Proceedings of the 12th European Conference on Computer Vision, Florence, Italy, Oct. 7, 2012, pp. 1-19.
Veksler et al., "Superpixels and Supervoxels in an Energy Optimization Framework", iProceedings of the 11th European Conference on Computer Vision, Heraklion, Greece, Sep. 5, 2010, pp. 211-224.
Yang et al., "Simultaneous egomotion estimation, segmentation, and moving object detection", Journal of Field Robotics, vol. 28, No. 4, Jul. 2011, pp. 564-588.
Zeng et al., "Structure-sensitive superpixels via geodesic distance", 2011 IEEE International Conference on Computer Vision (ICCV), Barcelona, Spain, Nov. 6, 2011, pp. 447-454.
Zitnick et al., "Stereo for Image-Based Rendering using Image Over-Segmentation", International Journal of Computer Vision, vol. 75, No. 1, Oct. 2007, pp. 1-32.

* cited by examiner

METHOD AND APPARATUS FOR GENERATING TEMPORALLY CONSISTENT SUPERPIXELS

This application claims the benefit, under 35 U.S.C. §365 of International Application PCT/EP2014/066631, filed Aug. 1, 2014, which was published in accordance with PCT Article 21(2) on Feb. 19, 2015 in English and which claims the benefit of European patent application No. 13306156.4, filed Aug. 16, 2013.

FIELD OF THE INVENTION

The present invention relates to a method and an apparatus for generating temporally consistent superpixels for a video sequence. More specifically, a method and an apparatus for generating temporally consistent superpixels are described, which are able to cope with erroneous temporal consistency.

BACKGROUND OF THE INVENTION

Superpixel algorithms represent a very useful and increasingly popular preprocessing step for a wide range of computer vision applications, such as segmentation, image parsing, classification etc. Grouping similar pixels into so called superpixels leads to a major reduction of the image primitives. This results in an increased computational efficiency for subsequent processing steps, allows for more complex algorithms computationally infeasible on pixel level, and creates a spatial support for region-based features.

Superpixel algorithms group pixels into superpixels. As indicated in X. Ren et al.: "*Learning a classification model for segmentation*", IEEE International Conference on Computer Vision (ICCV) 2003, pp. 10-17, superpixels are local, coherent, and preserve most of the structure necessary for segmentation at scale of interest. As further stipulated in the above document, superpixels should be roughly homogeneous in size and shape. Though many superpixel approaches mostly target still images and thus provide only a limited or no temporal consistency at all when applied on video sequences, some approaches target video sequences. See, for example, O. Veksler et al.: "*Superpixels and Supervoxels in an Energy Optimization Framework*", in Computer Vision—ECCV 2010, vol. 6315, K. Daniilidis et al., Eds. Springer Berlin/Heidelberg, 2010, pp. 211-224, or A. Levinshtein et al.: "*Spatiotemporal Closure*", in Computer Vision—ACCV 2010, vol. 6492, R. Kimmel et al., Eds. Springer Berlin/Heidelberg, 2011, pp. 369-382. These approaches start to deal with the issue of temporal consistency.

One state of the art approach for generating temporally consistent superpixels is detailed in the European Patent Application EP 2 680 226 A1. The approach is based on energy-minimizing clustering. It conceives the generation of superpixels as a clustering problem.

European Patent Application EP 2 733 666 A1 describes a further solution for generating temporally consistent superpixels, which includes a life-cycle management of the superpixels. A life-span, i.e. a duration, is determined for temporally consistent superpixels. Superpixels that grow too large are split and superpixels that become too small are terminated. The number of splits and terminations is kept balanced. For this purpose the development of the area occupied by each superpixel over time is monitored. In addition, a similarity check is introduced for the instances of a temporally consistent superpixel in a sliding window. The similarity between two or even more instances of a temporally consistent superpixel within the sliding window is determined. If it is below a certain threshold, the instances of the superpixel in all future frames of the sliding window are replaced by instances of a new temporally consistent superpixel starting at the first future frame.

SUMMARY OF THE INVENTION

It is an object of the present invention to propose an improved solution for generating temporally consistent superpixels associated to frames of a sequence of frames.

According to the invention, a method for generating temporally consistent superpixels associated to a frame of a sequence of frames comprises the steps of:
  separating a feature space of the sequence of frames into a color subspace and a spatial subspace;
  performing a clustering in the spatial subspace on a frame basis;
  performing a clustering in the color subspace on stacked frames; and
  detecting an erroneous temporal consistency of a superpixel associated to a frame by performing a similarity check between a corresponding superpixel in one or more past frames and one or more future frames using two or more metrics.

Accordingly, an apparatus configured to generate temporally consistent superpixels associated to frames of a sequence of frames comprises:
  a separator configured to separate a feature space of the sequence of frames into a color subspace and a spatial subspace;
  a spatial clustering unit configured to perform a clustering in the spatial subspace on a frame basis;
  a color clustering unit configured to perform a clustering in the color subspace on stacked frames; and
  a detector configured to detect an erroneous temporal consistency of a superpixel associated to a frame by performing a similarity check between a corresponding superpixel in one or more past frames and one or more future frames using two or more metrics.

Also, a computer readable storage medium has stored therein instructions enabling generating temporally consistent superpixels associated to frames of a sequence of frames, which when executed by a computer, cause the computer to:
  separate a feature space of the sequence of frames into a color subspace and a spatial subspace;
  perform a clustering in the spatial subspace on a frame basis;
  perform a clustering in the color subspace on stacked frames;
  detect an erroneous temporal consistency of a superpixel associated to a frame by performing a similarity check between a corresponding superpixel in one or more past frames and one or more future frames using two or more metrics.

The proposed solution provides a multi-stage superpixel similarity check to detect erroneous temporal consistency of superpixels. This may happen, for example, when the optical flow fails to provide a sufficiently reliable projection into the subsequent frame or the generation of new superpixels in an area of dis-occlusions erroneously displaces other surrounding superpixels. An erroneous temporal consistency occurs if superpixels in consecutive frames have the same label identifier but cover image regions that are different with respect to the image content. If the similarity conditions in all stages indicate a dissimilarity, the temporal consistency is marked as erroneous and a new and unique label identifier is introduced. This new label is assigned to all superpixels in the consecutive frames that erroneously have the same initial label. The similarity conditions in the multi-stage similarity check utilize different metrics in order to minimize the number of false positives, i.e. superpixels with an erroneous temporal consistency, and maximize the number of true positives, i.e. superpixels with a correct temporal consistency.

The solution thus further improves the generation of temporally consistent superpixels, which are beneficial for a wide range of computer vision applications ranging from segmentation, image parsing to classification etc.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

For a better comprehensibility of the proposed invention first a brief overview about temporally consistent superpixels is given.

The approach for temporally consistent superpixels, which is detailed, for example, in the European Patent Application EP 2 680 226 A1, is based on energy-minimizing clustering. It conceives the generation of superpixels as a clustering problem. But instead of introducing a temporal distance for the clustering in the video volume as done for supervoxel approaches, which favor short-time consistency, a different approach was taken.

In order to be able to generate temporally consistent superpixels, the original five-dimensional feature space for the superpixels was separated into a global color subspace comprising multiple frames and multiple local spatial subspaces on frame level, following the idea that the color clustering is done globally and the spatial clustering locally. As a consequence, each temporally consistent superpixel has a single color center for all frames and a separate spatial center for each frame. The latter preserves the spatial locality on frame level and the former ensures temporal consistency.

In order to allow for a certain degree of scene changes, e.g. gradual changes of illumination or color over time, a sliding window approach is utilized. For this, a window comprising W consecutive frames is shifted along the video volume frame by frame. This sliding window contains P so called past frames and F so called future frames and one current frame with $W=F+P+1$.

Figure 1:
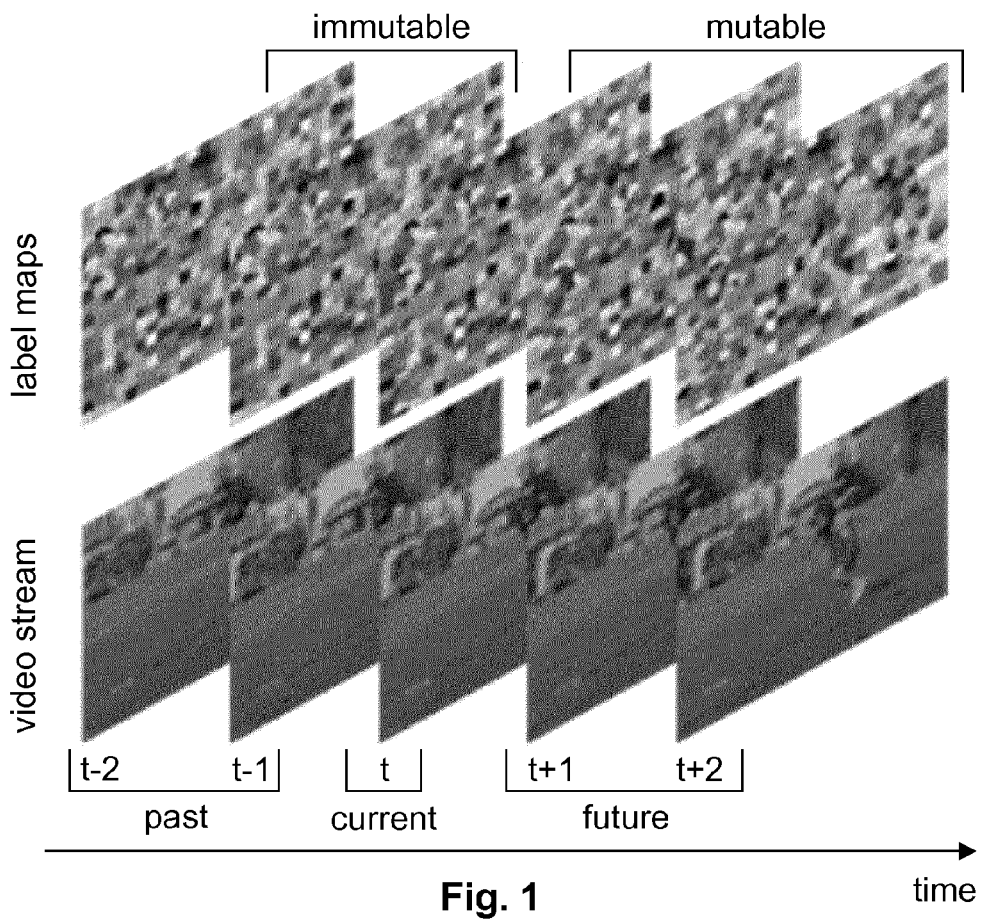
FIG. 1 illustrates a sliding window approach.

An example with $W=5$ and $P=F=2$ is depicted in FIG. 1. In this example, the frame t is the current frame and it is in the center of the sliding window. For the current frame, the resulting, final superpixel segmentation is generated. The past frames are immutable and thus will not be altered anymore, but they influence the superpixel generation in the current frame and future frames. The future frames are mutable as well as the current frame. In contrast to the past frames their superpixel segmentation is not fixed yet and thus can change during the optimization. The future frames help to adapt to changes in the scene, whereas the past frames are conservative and try to preserve the superpixel color clustering found. If more past than future frames are used, the update of the color center is more conservative. If more future than past frames are used, the update is more adaptive.

When the sliding window is shifted, all frames that were in the sliding window before are shifted by one position, i.e. from position $t+k$ to $t+k-1$ with $-P<k<=F$. A new frame enters the sliding window at position $t+F$. Its spatial centers are initialized by projecting the spatial centers of frame $t+F-1$ into frame $t+F$ using optical flow. Advantageously, a weighted average of the dense optical flow computed over all pixels assigned to the center is used. After the projection of the centers is done, the energy-minimizing clustering is performed.

Figure 2:
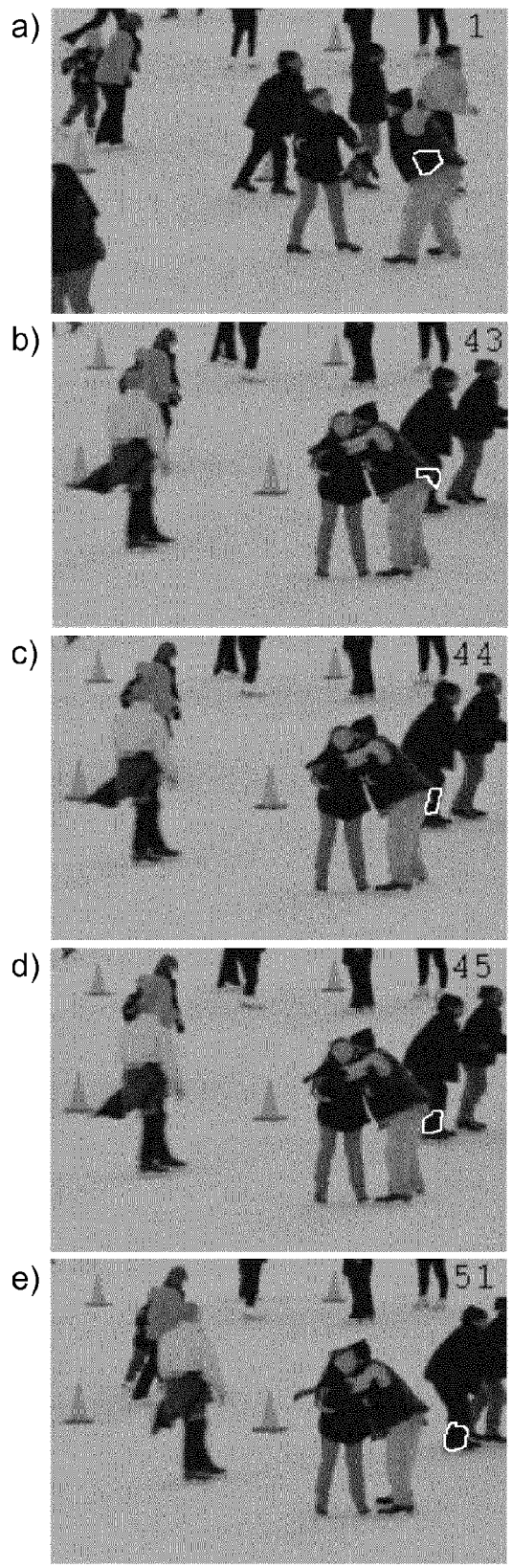
FIG. 2 shows an example of an erroneous temporal consistency.

An erroneous temporal consistency, i.e. false positives, can occur, for example, when the optical flow fails to provide a sufficiently correct projection into the subsequent frame. In such cases it is possible that the image region covered by the superpixel is not in the projected search window anymore. Moreover, sudden and disruptive changes in the video volume or dis-occlusion can also lead to an erroneous temporal consistency. In FIGS. 2 a) to e) an example of such an erroneous temporal consistency is given. The superpixel indicated by the white border exhibits an erroneous temporal consistency.

The proposed multi-stage similarity check combines different metrics in order to achieve a robust and high detection rate. The multi-stage similarity check comprises three stages and is applied after the superpixels were generated for the current frame t. The metrics that can be employed are amongst others: color histogram comparisons, such as chi-square distance or correlation, SIFT descriptor matching (SIFT: Scale-Invariant Feature Transform), or color differences, e.g. the Euclidean distance. Combining different metrics and applying the metrics on multiple instances increases the detection rate and improves the true positives to false positives ratio.

The pseudo code below describes the multi-stage similarity check in general terms. In this example "$metric_x(i-m, i+n,k)$" means that $metric_x$ is applied on the superpixels with label k in frame i−m and frame i+n.

For all labels k in frame t do the following:

```
if metric_A (t-m, t+n, k) >T_A then
    if metric_B (t-m, t+n, k) >T_B then
        if metric_B (t-m, t+n+1, k) >T_B then
            Introduce new label for all superpixels with label k
            in the frames >=t+n
        end if
    else if metric_A (t-m, t+n, k) >T_A2 then
        if metric_A (t-m, t+n+1, k) >T_A2 then
```

-continued

```
         Introduce new label for all superpixels with label k
   in the frames >=t+n
        end if
      end if
    end if
```

It should be noted that in the description above for $metric_A$ and $metric_B$ it holds that the higher the values, the less similar the superpixels. If a metric is applied for which it holds that the higher the value, the more similar the superpixels, e.g. for correlation, the algorithm has to be adjusted accordingly.

To give an example, for the CIELAB color space it has been found that the following settings give good results:
  $metric_A$=chi-square distance of normalized color histograms for superpixels
  $metric_B$=Euclidean distance of average color for superpixels m=3, n=1, $T_A$=0.6, $T_B$=14, $T_{A2}$=1.0

Figure 3:
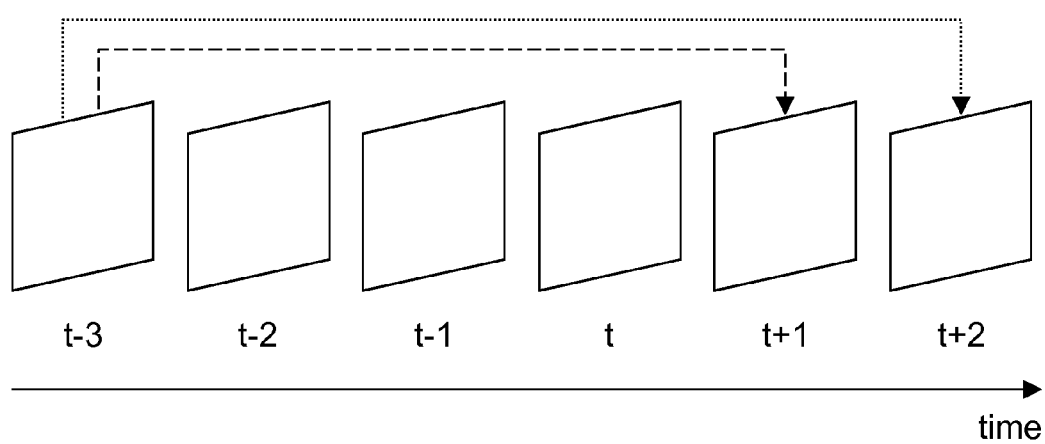
FIG. 3 illustrates an example of the frames used for a multi-stage similarity check.

FIG. 3 depicts which frames are used for the checks when m=3 and n=1.

As indicated in the above pseudo code by the step "Introduce new label for all superpixels with label k in the frame>=t+n", if the multi-stage similarity check detects an erroneous temporal consistency a new label is introduced in the so-called future frames.

Figure 4:
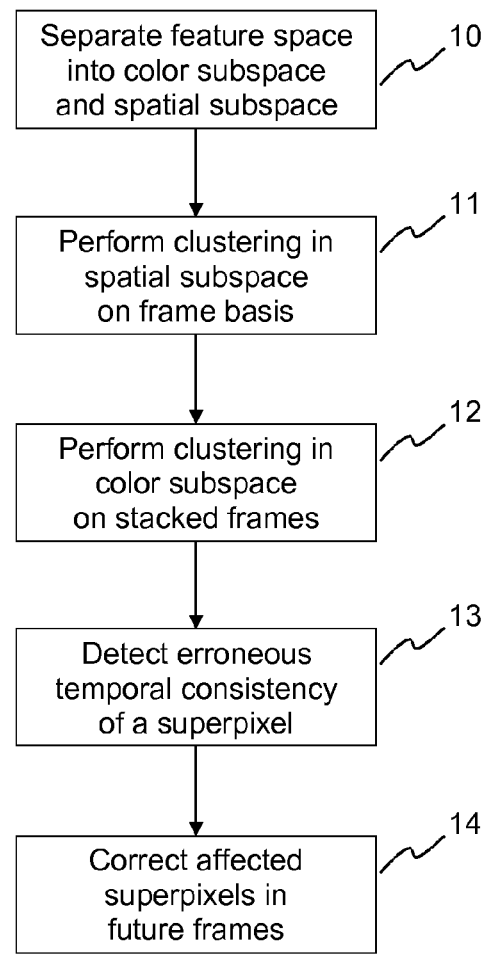
FIG. 4 schematically illustrates a method according to the invention.

A method according to the invention for generating temporally consistent superpixels associated to a frame of a sequence of frames is schematically illustrated in FIG. 4. In a first step a feature space of the sequence of frames is separated 10 into a color subspace and a spatial subspace. In the spatial subspace clustering 11 is then performed on a frame basis, whereas in the color subspace clustering 12 is performed on stacked frames. Then an erroneous temporal consistency of a superpixel associated to a frame is detected 13 by performing a similarity check between a corresponding superpixel in one or more past frames and one or more future frames using two or more metrics. When such an erroneous temporal consistency is detected 13, the affected superpixels is future frames are corrected 14 accordingly.

Figure 5:
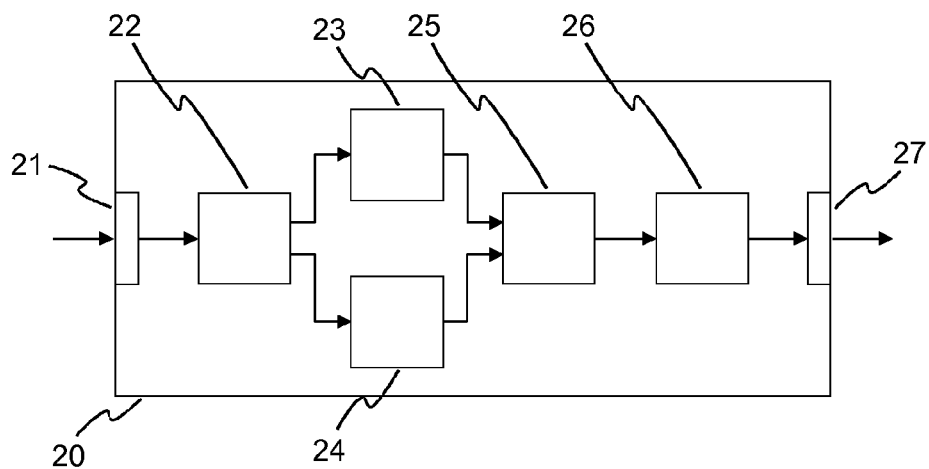
FIG. 5 schematically illustrates an apparatus configured to perform a method according to the invention.

FIG. 5 schematically illustrates an apparatus 20 according to the invention for generating temporally consistent superpixels associated to a frame of a sequence of frames. The apparatus 20 comprises an input 21 for receiving a sequence of frames. A separator 22 separates 10 a feature space of the sequence of frames into a color subspace and a spatial subspace. A spatial clustering unit 23 performing a clustering 11 in the spatial subspace on a frame basis. A color clustering unit 24 performs a clustering 12 in the color subspace on stacked frames. A detector 25 detect 13 an erroneous temporal consistency of a superpixel associated to a frame. For this purpose the detector 25 performs a similarity check between a corresponding superpixel in one or more past frames and one or more future frames using two or more metrics. A correction unit 26 corrects 14 the affected superpixels is future frames accordingly. The resulting superpixels are preferably made available at an output 27. Of course, the different elements of the apparatus 20 may likewise be fully or partially combined into a single unit or implemented as software running on a processor.

The invention claimed is:

1. A method for generating temporally consistent superpixels associated to a frame of a sequence of frames, the method comprising:
  separating a feature space of the sequence of frames into a color subspace and a spatial subspace;
  performing a clustering in the spatial subspace on a frame basis;
  performing a clustering in the color subspace on stacked frames; and
  detecting an erroneous temporal consistency of a superpixel associated to a frame by performing a similarity check between a corresponding superpixel in one or more past frames and one or more future frames using two or more metrics.

2. The method according to claim 1, wherein the two or more metrics include color histogram comparisons, descriptor matching, and color differences.

3. The method according to claim 2, wherein chi-square distance or correlation is analyzed for color histogram comparison.

4. The method according to claim 2, wherein descriptor matching is performed using scale-invariant feature transform descriptor matching.

5. The method according to claim 2, wherein color differences are analyzed using Euclidean distances.

6. The method according to claim 1, wherein the two or more metrics are compared with associated thresholds to detect an erroneous temporal consistency of a superpixel.

7. The method according to claim 1, wherein in case an erroneous temporal consistency is detected for a superpixel a new label is assigned to this superpixel for future frames.

8. An apparatus configured to generate temporally consistent superpixels associated to frames of a sequence of frames, wherein the apparatus comprises:
  a separator configured to separate a feature space of the sequence of frames into a color subspace and a spatial subspace;
  a spatial clustering unit configured to perform a clustering in the spatial subspace on a frame basis;
  a color clustering unit configured to perform a clustering in the color subspace on stacked frames; and
  a detector configured to detect an erroneous temporal consistency of a superpixel associated to a frame by performing a similarity check between a corresponding superpixel in one or more past frames and one or more future frames using two or more metrics.

9. A computer readable non-transitory storage medium having stored therein instructions enabling generating temporally consistent superpixels associated to frames of a sequence of frames, which, when executed by a computer, cause the computer to:
  separate a feature space of the sequence of frames into a color subspace and a spatial subspace;
  perform a clustering in the spatial subspace on a frame basis;
  perform a clustering in the color subspace on stacked frames;
  detect an erroneous temporal consistency of a superpixel associated to a frame by performing a similarity check between a corresponding superpixel in one or more past frames and one or more future frames using two or more metrics.

10. The apparatus according to claim 8, wherein the two or more metrics include color histogram comparisons, descriptor matching, and color differences.

11. The apparatus according to claim 10, wherein the detector is configured to analyze chi-square distance or correlation for color histogram comparison.

12. The apparatus according to claim 10, wherein the detector is configured to perform descriptor matching using scale-invariant feature transform descriptor matching.

13. The apparatus according to claim 10, wherein the detector is configured to analyze color differences using Euclidean distances.

14. The apparatus according to claim 8, wherein the detector is configured to compare the two or more metrics with associated thresholds to detect an erroneous temporal consistency of a superpixel.

15. The apparatus according to claim 8, wherein the apparatus is configured to assign a new label to a superpixel for future frames in case an erroneous temporal consistency is detected for this superpixel.

16. The computer readable non-transitory storage medium according to claim 9, wherein the two or more metrics include color histogram comparisons, descriptor matching, and color differences.

17. The computer readable non-transitory storage medium according to claim 16, wherein the instructions cause the computer to analyze chi-square distance or correlation for color histogram comparison.

18. The computer readable non-transitory storage medium according to claim 16, wherein the instructions cause the computer to perform descriptor matching using scale-invariant feature transform descriptor matching.

19. The computer readable non-transitory storage medium according to claim 16, wherein the instructions cause the computer to analyze color differences using Euclidean distances.

20. The computer readable non-transitory storage medium according to claim 9, wherein the instructions cause the computer to compare the two or more metrics with associated thresholds to detect an erroneous temporal consistency of a superpixel.

21. The computer readable non-transitory storage medium according to claim 9, wherein the instructions cause the computer to assign a new label to a superpixel for future frames in case an erroneous temporal consistency is detected for this superpixel.

* * * * *